United States Patent
Huffman et al.

(10) Patent No.: US 11,455,846 B2
(45) Date of Patent: Sep. 27, 2022

(54) CONSENSUS VEHICULAR COLLISION PROPERTIES DETERMINATION

(71) Applicant: INTERNATIONAL BUSINESS MACHINES CORPORATION, Armonk, NY (US)

(72) Inventors: Joel R. Huffman, Austin, TX (US); Frances Kim, Austin, TX (US); Clay Crenshaw, Austin, TX (US); Sambit Pattnaik, Austin, TX (US); Stefan Van Der Stockt, Austin, TX (US); Randall J. Gregory, II, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 939 days.

(21) Appl. No.: 16/238,917

(22) Filed: Jan. 3, 2019

(65) Prior Publication Data
US 2020/0219336 A1 Jul. 9, 2020

(51) Int. Cl.
*G07C 5/08* (2006.01)
*H04W 4/029* (2018.01)
(Continued)

(52) U.S. Cl.
CPC .......... *G07C 5/0841* (2013.01); *G06Q 40/08* (2013.01); *G07C 5/008* (2013.01); *G08G 1/0125* (2013.01);
(Continued)

(58) Field of Classification Search
CPC ...... G07C 5/0841; G07C 5/008; G06Q 40/08; G08G 1/0125; G08G 1/0112;
(Continued)

(56) References Cited

U.S. PATENT DOCUMENTS

| 1,162,800 | A | * | 12/1915 | Nehr | .................. | B28B 11/0818 |
| | | | | | | 425/392 |
| 6,609,053 | B1 | | 8/2003 | Breed | | |

(Continued)

FOREIGN PATENT DOCUMENTS

| WO | 2015052517 A1 | 4/2016 |
| WO | 2018007916 A1 | 1/2018 |

OTHER PUBLICATIONS

Gafurov, D., et al., "Gait Authentication and Identification Using Wearable Accelerometer Sensor", 2007 IEEE, 7 pgs. Retrieved on Oct. 29, 2018 from the Internet URL: <https://www.researchgate.net/profile/Patrick_Bours/publication/4258023_Gait_Authentication_and_Identification_Using_Wearable_Accelerometer_Sensor/links/0a85e5316d6203b470000000.pdf>.

(Continued)

*Primary Examiner* — James J Yang
(74) *Attorney, Agent, or Firm* — Daniel Yeates; Matthew M. Hulihan; Heslin Rothenberg Farley & Mesiti PC

(57) ABSTRACT

Consensus vehicular collision properties determination is provided by a method that receives mobile device sensor data from mobile device(s) of vehicle occupant(s). The vehicle is a vehicle of multiple vehicles involved in a collision, and the sensor data indicates movement and position information pertaining to the collision. The method shares the packaged sensor data to a decentralized ledger that stores this as part of a collection of sensor data from across multiple mobile devices of different vehicle occupants in the vehicles involved in the collision. Extraction and correlation of data from the ledger is used to determine consensus properties of the collision. The method determines, based on the consensus properties of the collision, which of the different vehicle occupants were driving the multiple vehicles involved in the collision and behavior of (Continued)

those occupants driving the multiple vehicles at the time of, and following, the collision.

19 Claims, 5 Drawing Sheets

(51) Int. Cl.
| | |
|---|---|
| *H04W 4/38* | (2018.01) |
| *G07C 5/00* | (2006.01) |
| *G08G 1/01* | (2006.01) |
| *G06Q 40/08* | (2012.01) |
| *H04W 4/44* | (2018.01) |
| *H04W 4/02* | (2018.01) |

(52) U.S. Cl.
CPC ........... *H04W 4/023* (2013.01); *H04W 4/029* (2018.02); *H04W 4/38* (2018.02); *H04W 4/44* (2018.02)

(58) Field of Classification Search
CPC ..... G08G 1/0129; G08G 1/017; H04W 4/023; H04W 4/029; H04W 4/38; H04W 4/44; H04W 4/46; H04W 4/80; H04W 4/40
See application file for complete search history.

(56) References Cited

U.S. PATENT DOCUMENTS

| | | | |
|---|---|---|---|
| 9,773,281 | B1 | 9/2017 | Hanson |
| 10,176,524 | B1* | 1/2019 | Brandmaier ......... G08G 1/0129 |
| 2012/0143630 | A1 | 6/2012 | Hertenstein |
| 2013/0069802 | A1 | 3/2013 | Foghel et al. |
| 2013/0070043 | A1* | 3/2013 | Geva ...................... G08B 21/06 348/14.02 |
| 2015/0127570 | A1 | 5/2015 | Doughty et al. |
| 2017/0302785 | A1* | 10/2017 | Abramson ........... G06Q 50/265 |
| 2018/0061151 | A1* | 3/2018 | Chainer ................. H04W 4/40 |
| 2018/0137759 | A1* | 5/2018 | Oh ......................... G08G 1/164 |
| 2018/0218549 | A1* | 8/2018 | Wahba ................... G06Q 10/00 |
| 2019/0210548 | A1* | 7/2019 | Levy ..................... B60R 21/013 |
| 2019/0287199 | A1* | 9/2019 | Messerges ............. H04L 51/18 |
| 2019/0354838 | A1* | 11/2019 | Zhang .................. G07C 5/0858 |

OTHER PUBLICATIONS

Mantyjarvi, A., et al., "Identifying users of portable devices from gait pattern with accelerometers", Conference Paper in Acoustics, Speech, and Signal Processing, 1988 International Conference on Apr. 2005, 5 pgs. Retrieved on Nov. 1, 2018 from the Internet URL: <https://www.researchgate.net/profile/Heikki_Ailisto/publication/224612430_Ailisto_Identifying_users_of_portable_devices_from_gait_pattern_with_accelerometers/links/53e9b3800cf2dc24b3cac2c6.pdf>.

Sano, A., et al., "Stress Recognition Using Wearable Sensors and Mobile Phones", 2013 Humaine Association Conference on Affective Computing and Intelligent Interaction, 2013 IEEE, pp. 671-676. Retrieved on Nov. 1, 2018 from the Internet URL: <https://affect.media.mit.edu/pdfs/13.Sano-etal-acii.pdf>.

Gafurov, D., et al., "Gait Recognition Using Wearable Motion Recording Sensors", EURASIP Journal on Advances in Signal Processing, vol. 2009, Article ID 415817, 16 pages. Retrieved on Nov. 1, 2018 from the Internet URL: <https://link.springer.com/content/pdf/10.1155/2009/415817.pdf>.

Ailisto, H., et al., "Identifying people from gait pattern with accelerometers", Proceedings of SPIE—The International Society for Optical Engineering • Mar. 2005, 9 pgs. Retrieved on Oct. 29, 2018 from the Internet URL: <https://www.researchgate.net/profile/Heikki_Ailisto/publication/241529587_Identifying_people_from_gait_pattern_with_accelerometers/links/53e070600cf2a768e4916434.pdf>.

Tao, W., "Gait Analysis Using Wearable Sensors", Sensors 2012, vol. 12, Issue 2, 63 pgs. Retrieved on Oct. 29, 2018 from the Internet URL: <http://www.mdpi.com/1424-8220/12/2/2255/htm>.

Mell, Peter, et al., "The NIST Definition of Cloud Computing", NIST Special Publication 800-145, Sep. 2011, Gaithersburg, MD, 7 pgs.

* cited by examiner

CONSENSUS VEHICULAR COLLISION PROPERTIES DETERMINATION

BACKGROUND

Often times processes followed by car insurance companies in their investigation of collisions and other motor vehicle incidents construct an assumed or likely scenario of what transpired during the incident. Because this is unable to be conclusively validated, disputes between involved parties can, and often do, arise in the claims investigation and adjudication process. A lack of irrefutable evidence describing characteristics of a particular vehicular incident can also result in insurance fraud.

SUMMARY

Shortcomings of the prior art are overcome and additional advantages are provided through the provision of a computer-implemented method. The method receives packaged mobile device sensor data from mobile device(s) of vehicle occupant(s) in a vehicle. The packaged mobile device sensor data includes movement and position data from the mobile device(s) and obtained by the mobile device(s) as the mobile device(s) travel with the vehicle occupant(s) in the vehicle. The vehicle is a vehicle of multiple vehicles involved in a collision, and the packaged mobile device sensor data indicates movement and position information pertaining to the collision. The method shares the packaged sensor data to a decentralized ledger. The decentralized ledger stores the shared packaged sensor data as part of a collection of sensor data. The collection of sensor data includes sensor data from across multiple mobile devices of different vehicle occupants in the multiple vehicles involved in the collision. The method extracts from the decentralized ledger the collection of sensor data from across the multiple mobile devices and correlates different sensor data thereof obtained from different mobile devices of the multiple mobile devices to determine consensus properties of the collision as informed by the collection of sensor data. The method also determined, based at least in part on the consensus properties of the collision, which of the different vehicle occupants were driving the multiple vehicles involved in the collision and behavior of the occupants driving the multiple vehicles at the time of, and following, the collision.

Further, a computer system is provided that includes a memory and a processor in communication with the memory. The computer system is configured to perform a method. The method receives packaged mobile device sensor data from mobile device(s) of vehicle occupant(s) in a vehicle. The packaged mobile device sensor data includes movement and position data from the mobile device(s) and obtained by the mobile device(s) as the mobile device(s) travel with the vehicle occupant(s) in the vehicle. The vehicle is a vehicle of multiple vehicles involved in a collision, and the packaged mobile device sensor data indicates movement and position information pertaining to the collision. The method shares the packaged sensor data to a decentralized ledger. The decentralized ledger stores the shared packaged sensor data as part of a collection of sensor data. The collection of sensor data includes sensor data from across multiple mobile devices of different vehicle occupants in the multiple vehicles involved in the collision. The method extracts from the decentralized ledger the collection of sensor data from across the multiple mobile devices and correlates different sensor data thereof obtained from different mobile devices of the multiple mobile devices to determine consensus properties of the collision as informed by the collection of sensor data. The method also determined, based at least in part on the consensus properties of the collision, which of the different vehicle occupants were driving the multiple vehicles involved in the collision and behavior of the occupants driving the multiple vehicles at the time of, and following, the collision.

Yet further, a computer program product including a computer readable storage medium readable by a processing circuit and storing instructions for execution by the processing circuit is provided for performing a method. The method receives packaged mobile device sensor data from mobile device(s) of vehicle occupant(s) in a vehicle. The packaged mobile device sensor data includes movement and position data from the mobile device(s) and obtained by the mobile device(s) as the mobile device(s) travel with the vehicle occupant(s) in the vehicle. The vehicle is a vehicle of multiple vehicles involved in a collision, and the packaged mobile device sensor data indicates movement and position information pertaining to the collision. The method shares the packaged sensor data to a decentralized ledger. The decentralized ledger stores the shared packaged sensor data as part of a collection of sensor data. The collection of sensor data includes sensor data from across multiple mobile devices of different vehicle occupants in the multiple vehicles involved in the collision. The method extracts from the decentralized ledger the collection of sensor data from across the multiple mobile devices and correlates different sensor data thereof obtained from different mobile devices of the multiple mobile devices to determine consensus properties of the collision as informed by the collection of sensor data. The method also determined, based at least in part on the consensus properties of the collision, which of the different vehicle occupants were driving the multiple vehicles involved in the collision and behavior of the occupants driving the multiple vehicles at the time of, and following, the collision.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
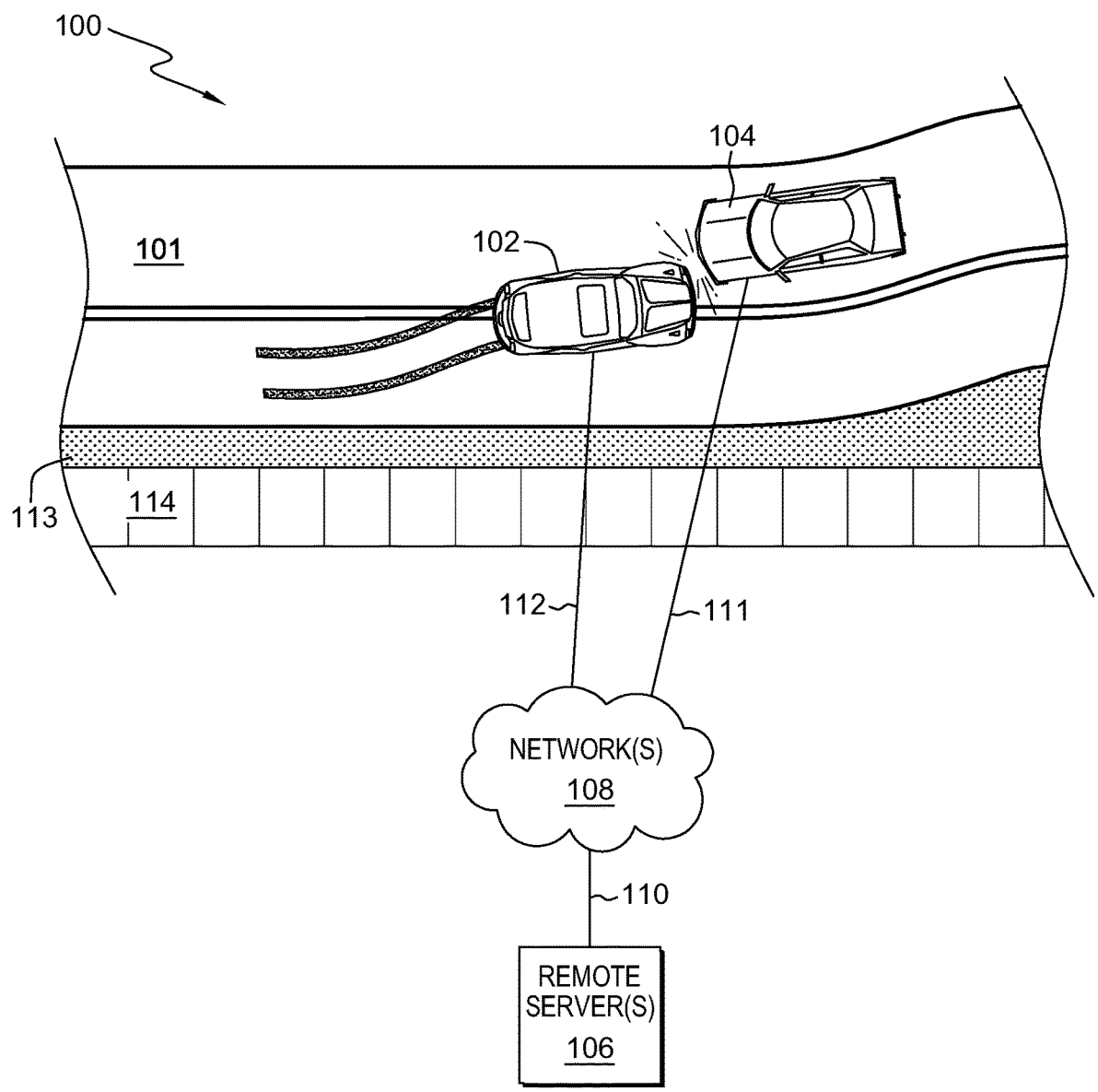
FIG. 1 depicts an example environment to incorporate and use aspects described herein.

Described herein are approaches for utilizing mobile device sensory input to provide evidence informing of consensus properties of vehicular collisions. Using data from mobile device sensors, such as Global Positioning System (GPS) sensors, accelerometers, gyroscopes, microphones, cameras, and any other desired sensors of mobile devices (e.g. smartphones, 'wearables', etc.), processes can detect properties of vehicular collisions, for instance to confirm that vehicles have collided and which vehicles were involved, who was driving each of the involved vehicles, and what the behavior was of the driver any other vehicle occupants, as well as any associated properties of the collision. The data can provide strong, possibly irrefutable evidence of these properties of the collision. This can benefit claims adjudication processes, as an example. Additionally, it can help as a deterrent against the commission insurance fraud and/or assist in the identification of occurrences of insurance fraud.

Approaches described herein can be scaled out to any desired user/participants, examples of which include insurance industry entities, such as automobile insurance companies, to assist with claims investigation, foster speedy claim resolution, and prevent fraud.

As explained in further detail, a distributed, decentralized ledger can be utilized to create an irrefutable evidence trail of data describing events leading up to, during, and after a collision. The veracity of such a ledger, data included therein, and/or conclusions drawn from the ledger or such data, may render it suitable for use by law enforcement, for instance as evidence in court proceedings.

Mobile phone technology is leveraged to help determine consensus properties—those that are suggested by data from multiple mobile devices of individuals involved in a vehicular incident, including behaviors between motorists—to benefit roadway safety and settlement of disputes pertaining to the incident.

Sensors are commonly embedded within smartphones, tablets, wearable devices, and other mobile devices. Some dedicated vehicle systems can contain collision detection and GPS capabilities, but these systems may have fewer sensors than mobile devices, and generally do not sense occupant properties, such as heart rate and hand movements, or acquire accelerometer and gyroscopic data that can indicate where different vehicle occupants sat in the vehicle. Since there are considerably more mobile devices traveling with vehicles than there are dedicated vehicle systems, processing mobile device sensor data can be less expensive and easier to deploy and update than working with dedicated vehicle systems.

Systems described herein can contribute data from mobile devices present in vehicles involved in a collision to a collection of data maintained in a distributed and decentralized ledger. The collective data of the mobile devices can ratify and support various consensus properties, for instance that a collision has taken place, the location and behavior of occupants in the involved vehicles, properties, such as speed, trajectory, location, etc. of the vehicles prior to and at the time of the collision, and other properties. In particular embodiments, each occupant's mobile device(s) upload to a respective entity sensor data acquired from the mobile device(s). In some aspects, this data sharing is triggered when a collision occurs, i.e. as opposed to contributing to the prediction or prevention of an accident. The entity receiving this data could be an insurance company that insures that occupant, or an insurance company that insures the vehicle, or driver thereof, in which the occupant is riding. This data can be uploaded to an insurance company server for processing. As part of that processing, the server can share the data (i.e. by contributing it to a distributed ledger) with other entities, such as other insurance companies of other involved parties and/or law enforcement entities, such as a local, state, or national level law enforcement agency or department.

Ostensibly, each person that is present in an involved vehicle and having embedded capability in the form of mobile device(s) together with software to upload the data (e.g. an insurer mobile application) can provide irrefutable and non-repudiated (and overlapping) evidence that corroborate the event and establish consensus properties of the event.

In particular examples, aspects described herein can provide facilities (software, hardware) offered as a service to which insurance companies and law enforcement agencies subscribe to assist in collision investigation by way of reduced time and costs associated therewith. The technology can be used in the adjudication of insurance claims, for instance when it is unclear who was driving a vehicle in a collision. The gathered data can create an irrefutable, non-repudiated evidence trail describing the events, individuals involved, and other properties of the collision. This can be primarily intended to generate valid supporting evidence for an automobile accident claim or trial rather than, for instance, to make legal conclusions, such as determinations of fault. The data can be housed in a distributed ledger which may be admissible in court proceedings.

Wearable mobile devices ("wearables") can be used to detect particular actions of the wearer, for instance the activity of an occupant involved in an automobile accident and wearing such a device. The device can record the activity in a secure storage to preserve it as valid evidence. The data can also detail device orientation, kinetics, and kinematics, which can be used to understand the force of impact and location of the device, and therefore the vehicle/occupants. User activity, which could include movement activity informing of movement properties, such as user gait, could be used to uniquely identify the particular wearer of the mobile device. Additionally, wearable devices and associated mobile device sensors can be used to identify user stress (e.g. based on accelerometers and skin conductance). Obtained sensor data can be recorded and used to detect stress patterns, which can be relevant to the identification of stress levels of vehicle occupants and useful evidence in determining properties of a collision.

FIG. 1 depicts an example environment 100 to incorporate and use aspects described herein, in which a collision occurs between two vehicles on a roadway. Roadway 101 is a two-lane, two-way road adjacent a road shoulder 113 and sidewalk 114. Vehicles 102, 104 travel on roadway 101. Environment 100 also includes one or more remote server(s) 106 coupled to, and in communication with, network(s) 108 via communications link(s) 110. Each of vehicles 102 and 104 include respective occupant(s) traveling therein. Each such occupant has/wears one or more mobile devices. These mobile devices communicate with network(s) 108 via communications links labeled 112 (for links between the network(s) and mobile devices of occupants in vehicle 102) and 111 (for links between the network(s) and mobile devices of occupants in vehicle 104), respectively, and communicate with remote server 106.

Communications links 111 and 112 may be or include any appropriate wireless or wired communication links for communicating data, though typically they would be or include wireless communication links, such as a cellular, Wi-Fi, and/or other types of wireless connections. In some embodiments, connectivity of a mobile device to a network can be made by proxy via another mobile device. For instance, a wearable mobile device, such as a smartwatch, of an occupant of the vehicle is connected to network 108(s) via a wireless (e.g. Bluetooth) connection to the user's smartphone, which is connected to network(s) 108 via a cellular and/or Wi-Fi connection, as examples. Additionally or alternatively, a vehicle may include an onboard computer system through which occupant mobile devices communicate with network(s) 108 and server(s) 106.

In some aspects, mobile devices of vehicle occupants obtain sensor data from sensors of the devices and send the sensor data across the communications link(s) to remote server(s) 106 via network(s) 108. Sensor data can include any data acquired by any type of sensors of the mobile devices. Example sensors include Global Positioning System (GPS) sensors, accelerometers, gyroscopes, microphones, cameras, and/or any other desired sensors of mobile devices.

In the example of FIG. 1, vehicle 102 has swerved into oncoming vehicle 104, resulting in a collision. Occurrence of this collision is detected by any desired method. One such method is by way of software executing on the mobile devices detecting the collision by analyzing collected mobile device sensor data. The mobile devices can be configured to capture and at least temporary store sensor data. In accordance with aspects described herein, sensor data can then be provided to remote server(s) 108 upon detecting a collision. In some examples, a respective application installed on each mobile device uploads secured data to a respective server 108. The secured data could be sensor data obtained from sensors and housed as part of an operating system-provided facility, which is then secured (e.g. encrypted) and made available to the application. In particular examples, the application is a mobile application of an insurance company and the server to which the sensor data is upload is a server maintained or controlled by the insurance company. The data can inform mobile device movement (and by implication occupant and vehicle movement) and biometric information describing occupant physical states (blood pressure, heart rate, etc.), among other possible types of information.

Further aspects of collision detection, storing and transmitting event data, spatio-temporal proximity corroboration, and known anomaly detection are now described.

Collision detection—Initially, as presented by the example environment of FIG. 1, one or more mobile devices travel with respective vehicle occupant(s) in each of the vehicles involved in the collision. Various sensors (e.g. GPS, accelerometer, gyroscope, microphone, etc.) can be used to detect whether an accident has occurred, for instance based on gathered movement, position, and/or audio data.

Storing and transmitting the event data—Mobile device users/owners can consent to use technology described herein, for instance during acceptance of terms of use of an insurance application that the user installs on the device(s). In some embodiments, technology described herein can lay dormant on a mobile device until consent to use the technology is explicitly granted by the user. This may be desired because of legal requirements for particular jurisdictions.

The mobile devices can report mobile device sensor data to an entity, such as the user's insurance company, i.e. server(s) thereof, when a collision event is detected. The data can include data sensed before, during, and/or after the collision, and may be reported in aggregate or via multiple transmissions over a length of time.

The mobile device sensor data can be packaged, for instance encrypted and/or compressed. Device manufacturers can provide a secure data capture, store, and/or package facility, from which individual user-level applications (like an insurance company application) can request data for sending to a remote server. Thus, each mobile device can securely store sensor data, package, and upload it to target(s), such as server(s).

In some embodiments upon detecting a collision, mobile device(s) can enter into a different, "heightened" sensing mode to provide higher fidelity data from available sensory inputs. The heightened sensing can deliver enhanced data resolution/accuracy, for instance by acquiring measurements at greater precision and/or by increasing sampling rate (for instance from one sample per minute to 30 samples per minute). The data that a mobile device packages and sends can include this higher fidelity data, data obtained when detecting the collision, or a combination of the two.

Sensor data of the different mobile devices can be separately provided by those mobile devices to different servers. These servers can in turn store the respective portions of sensor data they received to a decentralized ledger, for instance one operated by a private consortium of insurers and/or law enforcement agencies. Sensor data from across the multiple mobile devices of the different vehicle occupants in the different vehicles involved in the collision can therefore be obtained and contributed to the decentralized ledger by multiple different servers, each being in communication with a different set of mobile devices of the multiple mobile devices. Thus, an upload from one server to the ledger can store/shared packaged sensor data to the ledger, which maintains this as part of a collection of sensor data that includes sensor data from across the different mobile devices of the different vehicle occupants in the multiple vehicles involved in the collision. In some examples, the decentralized ledger includes a blockchain distributed among the private consortium of entities.

In some examples, sensor data is collected by a user-level application. In other examples, the mobile device operating system can natively obtain and securely store sensor data, and individual user-level applications can subscribe to and request that data, for instance via an exposed API.

Spatio-temporal proximity corroboration—Once a collision is detected, remote systems, such as servers of the insurance companies and/or partners, can check for other cars in the area (say within a threshold distance of the detected collision) that also had a collision event. This could be indicated by data added the ledger, for instance. The system could determine a location of a subject vehicle at the time of a collision, as indicated by the packaged mobile device sensor data received from mobile device(s) within that vehicle. Then the system can identify, based on access it has to the decentralized ledger and therefore other data reported to it, as well as the determined location of the collision, which are the vehicles involved in the collision, i.e. the subject vehicle and other vehicle(s) within a threshold distance of the vehicle at the time of the collision. Vehicles in a given vicinity could be assumed to be involved in the collision.

As one example, a haversine distance (based on the haversine formula) can be used to determine distances between vehicles and correlate multiple accident events to a common geohash location. Geohashing can provide an efficient form of filtering to identify the particular vehicles that are candidates as having been involved in the collision. Such geohashes of the vehicle and other vehicles can be used to determine the location of the vehicle and distances between the vehicle and the other vehicles, to identify which were involved. Additionally or alternatively, collected sensor data from the vehicles can be analyzed to verify whether the vehicle's movement (by way of the mobile device data) suggests that it was involved in the collision.

Known anomaly detection—Typically after an accident, certain behaviors can be expected from the different vehicle occupants. Drivers may be statistically more likely to behave in certain manners than other, non-driver, vehicle occupants following a collision. Aspects can check sensor data to understand who was involved and what their role was. For instance, it can be determined based on consensus properties of the collision as informed by the collection of sensor data in the ledger which of the different vehicle occupants were driving the different vehicles involved in the collision and behavior of those occupants at the time of, and following, the collision.

Other properties of the collision can be determined and corroborated based on the received data, for instance trajectories of the vehicles, locations, timing, and other properties. Consensus properties can refer to those that are at least generally in alignment across data from different mobile devices of vehicle occupants. It could also include properties that are suggested by sensor data from just one mobile device, when that data is not inconsistent or refuted by data of another mobile device.

One or more servers, collectively or individually, can extract from the decentralized ledger a relevant collection of sensor data, i.e. sensor data obtained from mobile devices of occupants in the vehicles identified to be involved in a collision. Example such servers include computer systems under the control or operation of insurance companies and/or law enforcement. Different sensor data obtained from different mobile devices of the multiple mobile devices can be correlated to determine consensus properties of the collision, which can include items or properties for which the data is in agreement (or at least not in disagreement) as informed by the collection of sensor data. The consensus properties of the collision can include, for instance, a confirmation that the collision occurred, where it occurred, the timing, the positioning, movement, speed, and trajectory of the vehicles before, during, and after the collision, the position of occupants of vehicles, behavior of occupants, and audio communications exchanged before, during, and after the collision, among any other desired properties.

Figure 2:
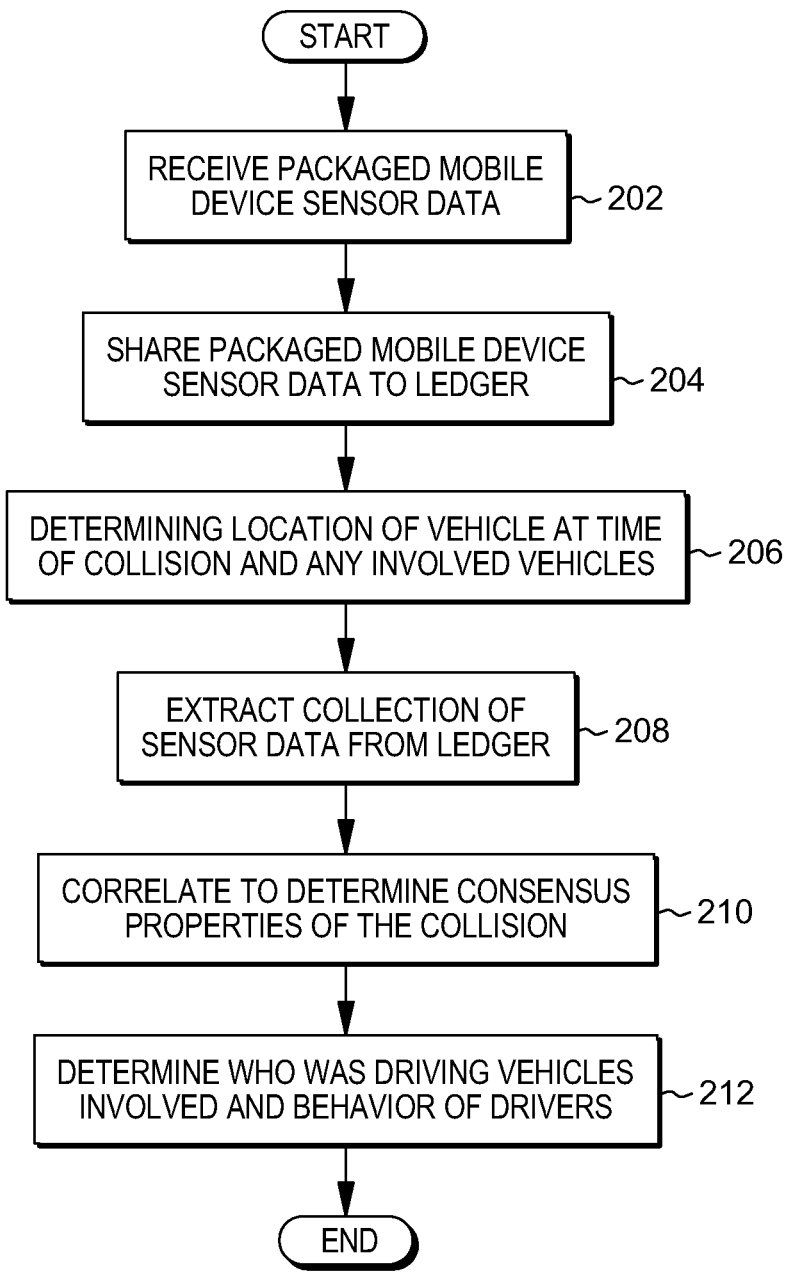
FIG. 2 depicts an example process for consensus vehicular collision property determination, in accordance with aspects described herein.

FIG. 2 depicts an example process for consensus vehicular collision properties determination, in accordance with aspects described herein. In some examples, this collision properties processing, and/or individual aspects thereof, is performed by one or more computer systems, such as those described herein, and may include one or more mobile devices, one or more cloud or remote servers, and/or one or more other computer systems. Such computer system(s) could be one or more computer systems of vehicle occupants, at least one insurance company, and/or at least one law enforcement agency, as examples.

The process receives (202) packaged mobile device sensor data from one or more mobile devices of one or more vehicle occupants in a vehicle. The received sensor data is, for instance, data that a remote server receives from the mobile device(s) in a vehicle, where the one or more occupants are vehicle occupant(s) and each possesses a respective one or more mobile devices. Thus, the packaged mobile device sensor data could refer to separate 'packages' of sensor data obtained from each of several mobile devices, or could refer collectively to all of the (packages of) data received from a collection of mobile devices, such as the devices of a single vehicle occupant, as an example. Each mobile device could upload, to a respective one or more targets (such as insurance company server(s) of an insurer of the occupant and/or vehicle driver), a respective portion of the packaged mobile device sensor data.

The packaged mobile device sensor data can include movement and position data from the one or more mobile devices. This data may be obtained by the one or more mobile devices as the one or more mobile devices travel with the one or more vehicle occupants in the vehicle.

The vehicle is one vehicle of multiple (two or more) vehicles involved in a collision. The packaged mobile device sensor data, for instance the movement and position data, can indicate movement and position information pertaining to the collision.

In some examples, the receipt of the packaged mobile device sensor data from the one or more mobile devices is triggered by/based on the one or more mobile devices detecting that the collision occurred. Detecting that the collision occurred could trigger processing to package and/or transmit the data to remote server(s).

The received sensor data can then be contributed to a decentralized ledger. Thus, the process of FIG. 2 continues by sharing (204) the packaged sensor data to a decentralized ledger. The decentralized ledger can store (i.e. contain, house) the shared packaged sensor data as part of a collection of sensor data. The collection of sensor data can include sensor data from across multiple mobile devices of different vehicle occupants in the multiple vehicles involved in the collision. The collection includes, for example, data from one or more GPS sensors, one or more accelerometers, one or more gyroscopic sensors, one or more microphones, and/or one or more cameras of the multiple mobile devices. As noted, each such mobile device can securely store, package, and provide (via a receiving server of the packaged sensor data) its contribution to the collection, rather than, for example, sharing to a central entity (such as a dedicated vehicle computer system), which could diminish security and reliability. However, such sharing may be done in alternative embodiments, if desired.

The decentralized ledger can include a blockchain that is distributed among a private consortium of entities. Sensor data from across the multiple mobile devices of different vehicle occupants in the multiple vehicles involved in the collision can be obtained by multiple different servers and contributed to the decentralized ledger by the multiple different servers, with such server being in communication with a different set of mobile devices of the multiple mobile devices. In other words, different mobile devices can be in communication with different servers of different entities, which each contribute received data to the ledger. In some embodiments, there are safeguards (such as checksums, encryption, or the like) put into place to avoid the intermediary servers between the mobile devices and the ledger from tampering with the packaged data.

Continuing with FIG. 2, the process determines a location of the vehicle at the time of the collision, as indicated by the packaged mobile device sensor data, and any involved vehicles (206). For instance, the process can identify, based on the decentralized ledger (specifically the other sensor data in the ledger, as provided from other mobile devices of other occupants in other vehicles), and based on the determined location of the vehicle at the time of the collision, the multiple vehicles that were involved in the collision. The multiple vehicles can be identified as the vehicle (from 202) and any other vehicle(s) within a threshold distance of that vehicle at the time of the collision.

The process extracts (208) from the decentralized ledger the collection of sensor data from across the multiple mobile devices and correlates (210) different sensor data thereof, obtained from different mobile devices of the multiple mobile devices, to determine consensus properties of the collision. For instance, the extracting can extract, as part of the collection of sensor data, sensor data from mobile devices of vehicle occupants in the other vehicle(s) involved in the collision.

In some examples, geohashes of the vehicle and the other vehicles are used to determine the location of the vehicle and distances between the vehicle and the other vehicles involved.

Consensus properties can be any properties, values, or the like for which the data is in agreement, or at least not in disagreement, as informed by the collection of sensor data. For instance, the consensus properties of the collision can include confirmation that the collision occurred.

In particular, the process of FIG. 2 continues by determining (212), based at least in part on the consensus properties of the collision, which of the different vehicle occupants were driving the multiple vehicles involved in the collision and behavior of the occupants driving the multiple vehicles at the time of, and following, the collision. Consensus properties can indicate which occupants were where in the involved vehicles, and also indicate behavior (movement, communication, biometric information, etc.) of the occupants, including drivers and non-drivers. From this, it can be determined with high or perfect certainty who was operating each of the vehicles involved in the collision.

In some examples, a mobile device enters into a "heightened sense mode" based on sensing and/or confirming (i.e. as a consensus property) that a collision occurred. The device could sample sensor data at a first interval/precision, detect a collision or other trigger, then switch to sampling at a second interval/precision. Some or all of this data can be packaged and sent for inclusion in the ledger. Additionally or alternatively, sample interval/precision could be adjusted, perhaps for a second time, after at least some consensus properties of the collision are determined. In the heightened sense mode, sensors obtain higher fidelity, more frequent information and/or the collection of data from other sensors is activated. For example, the GPS sensor, microphone, gyroscope(s), accelerometer(s) and/or other sensors are activated and/or sense at a higher resolution, quality, accuracy, frequency, or the like. The servers can receive and store to the ledger additional captured data of this higher fidelity. In this manner, a mobile device can detect that the collision occurred based on its own sampled data acquired with first sampling properties, and set itself, in response, to a heightened sense mode in which sensor data resolution, sensor data quality, sensor data accuracy, and/or sampling frequency (as examples) is increased. The resulting higher-fidelity data can be some or a portion of the packaged mobile device sensor data that is sent by the mobile device. Consequently, a receiving server can receive the sent packaged data based on the mobile device's actions to sense the collision and begin acquiring data at the higher fidelity for provision as part of the packaged sensor data. The higher fidelity data may be useful to better inform of the specific circumstances surrounding the collision and its aftermath, including actions and behavior of occupants.

Collisions of the above examples involve multiple vehicles, however embodiments contemplated by this disclosure include, and aspects describe herein apply to, collisions involving only a single vehicle. For instance, packages of mobile device sensor data can be received from each of multiple mobile devices across multiple occupants of a vehicle involved in a single-vehicle collision or other incident involving just one vehicle. The mobile devices can upload their sensor data to one or more server(s) that share the packages of sensor data to the ledger. The shared sensor data from the different mobile devices in the vehicle involved in the collision can be extracted and consensus properties of the collision determined therefrom.

In a particular example, one or more processes executing on one or more servers can each receive package(s) of mobile device sensor data from respective mobile device(s) of vehicle occupant(s) in a vehicle. The package(s) of mobile device sensor data can include movement and position data from mobile device(s) and obtained by the mobile device(s) as the mobile device(s) travel with the vehicle occupant(s) in the vehicle, which is involved in a collision. The package(s) of mobile device sensor data can indicate movement and position information pertaining to the collision. Each process can share to a decentralized ledger the respective package(s) of sensor data that it receives. The decentralized ledger can store the shared packages of sensor data as part of a collection of sensor data, the collection of sensor data including sensor data from across multiple mobile devices of different vehicle occupants in the vehicle involved in the collision. One or more processes can extract from the decentralized ledger the collection of sensor data that was received from across the multiple mobile devices of the different occupants and correlate different sensor data thereof obtained from different mobile devices of the multiple mobile devices to determine consensus properties of the collision as informed by the collection of sensor data. Various information can be determined based on the consensus properties, for instance which of the different vehicle occupants in the vehicle was driving the vehicle involved in the collision, and behavior of vehicle occupant(s) at the time of, and following, the collision.

Although various examples are provided, variations are possible without departing from a spirit of the claimed aspects.

Figure 3:
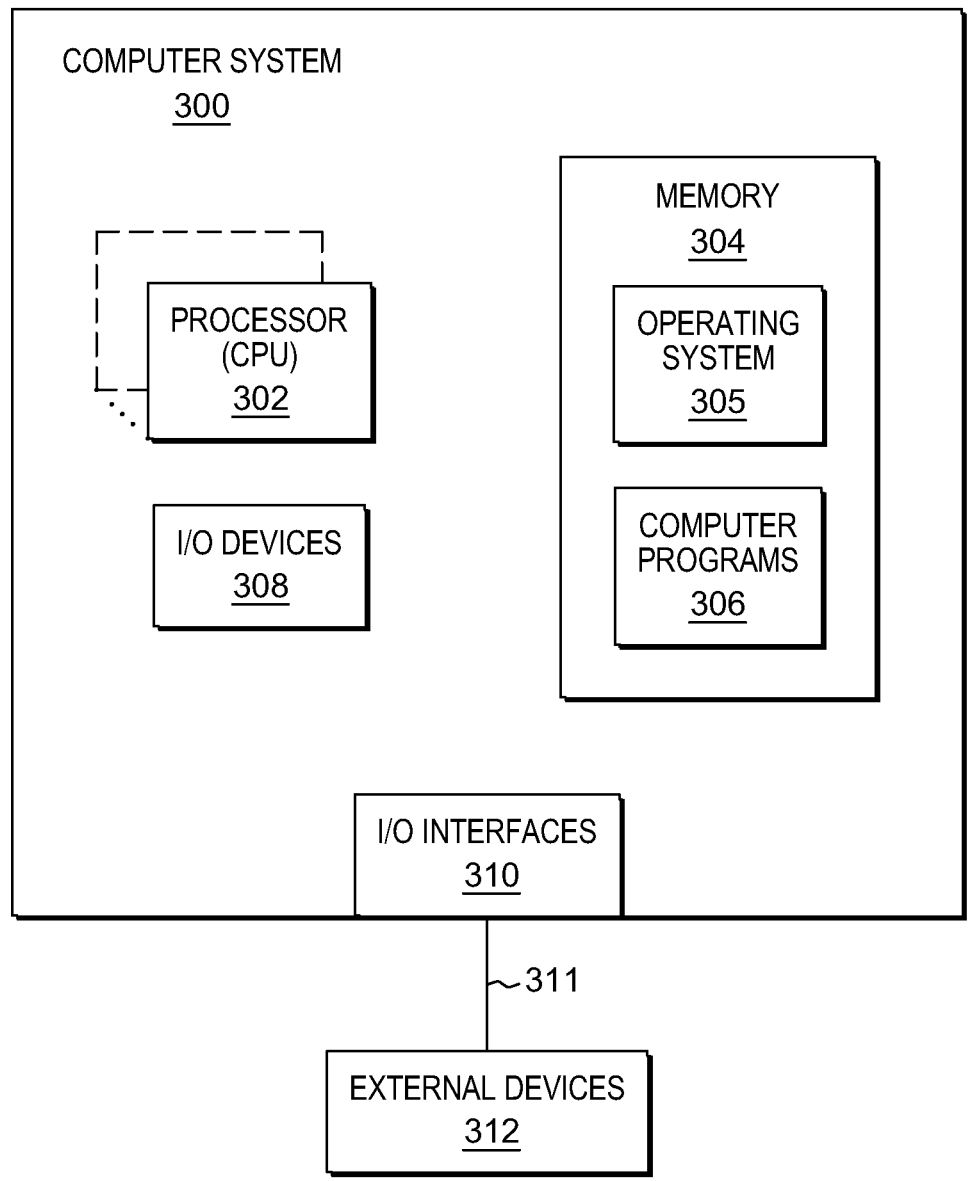
FIG. 3 depicts one example of a computer system and associated devices to incorporate and/or use aspects described herein.

Processes described herein may be performed singly or collectively by one or more computer systems, such as mobile device(s), server(s), or a combination of the foregoing, as examples. FIG. 3 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 3 shows a computer system 300 in communication with external device(s) 312. Computer system 300 includes one or more processor(s) 302, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 302 can also include register(s) to be used by one or more of the functional components. Computer system 300 also includes memory 304, input/output (I/O) devices 308, and I/O interfaces 310, which may be coupled to processor(s) 302 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 304 can be or include main or system memory (e.g. Random Access Memory) used in the execution of program instructions, storage device(s) such as hard drive(s), flash media, or optical media as examples, and/or cache memory, as examples. Memory 304 can include, for instance, a cache, such as a shared cache, which may be coupled to local caches (examples include L1 cache, L2 cache, etc.) of processor(s) 302. Additionally, memory 304 may be or include at least one computer program product having a set (e.g., at least one) of program modules, instructions, code or the like that is/are configured to carry out functions of embodiments described herein when executed by one or more processors.

Memory 304 can store an operating system 305 and other computer programs 306, such as one or more computer programs/applications that execute to perform aspects described herein. Specifically, programs/applications can include computer readable program instructions that may be configured to carry out functions of embodiments of aspects described herein.

Examples of I/O devices 308 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (312) coupled to the computer system through one or more I/O interfaces 310.

Computer system 300 may communicate with one or more external devices 312 via one or more I/O interfaces 310. Example external devices include a keyboard, a pointing device, a display, and/or any other devices that enable a user to interact with computer system 300. Other example external devices include any device that enables computer system 300 to communicate with one or more other computing systems or peripheral devices such as a printer. A network interface/adapter is an example I/O interface that enables computer system 300 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 310 and external devices 312 can occur across wired and/or wireless communications link(s) 311, such as Ethernet-based wired or wireless connections. Example wireless connections include cellular, Wi-Fi, Bluetooth®, proximity-based, near-field, or other types of wireless connections. More generally, communications link(s) 311 may be any appropriate wireless and/or wired communication link(s) for communicating data.

Particular external device(s) 312 may include one or more data storage devices, which may store one or more programs, one or more computer readable program instructions, and/or data, etc. Computer system 300 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 300 may be operational with numerous other general purpose or special purpose computing system environments or configurations. Computer system 300 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
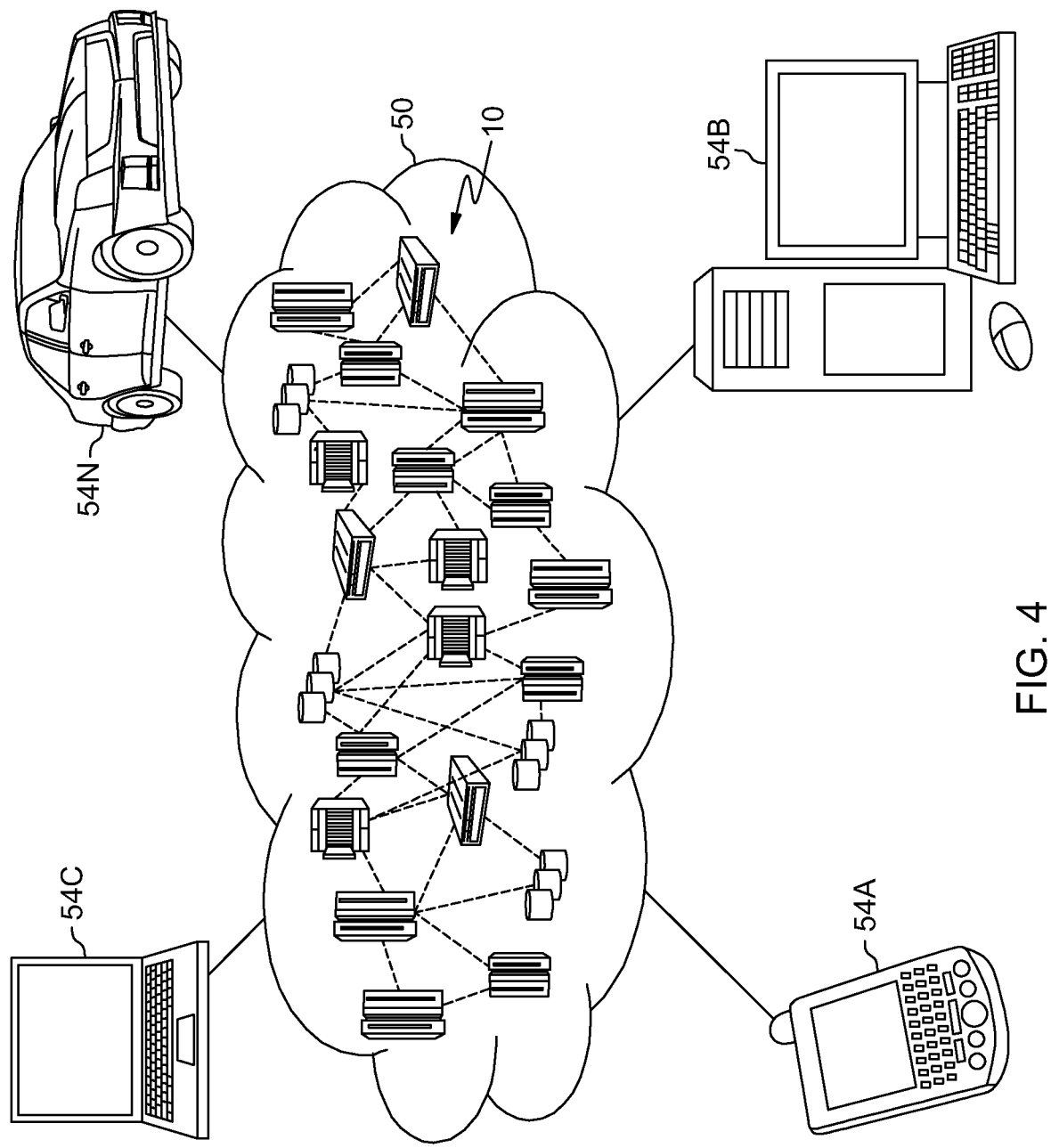
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
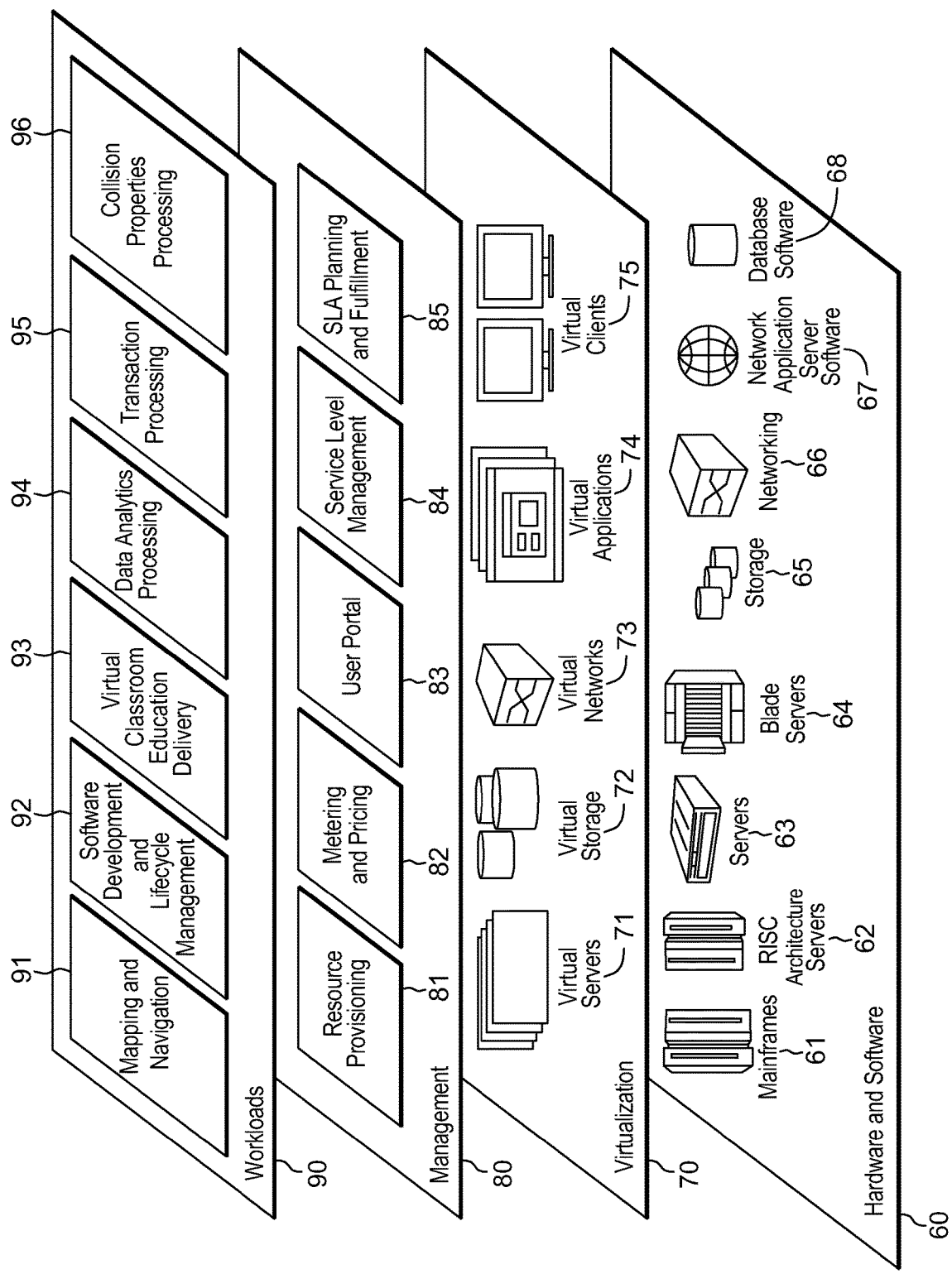
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collision properties processing 96.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving packaged mobile device sensor data from one or more mobile devices of one or more vehicle occupants in a vehicle, the packaged mobile device sensor data comprising movement and position data from the one or more mobile devices and obtained by the one or more mobile devices as the one or more mobile devices travel with the one or more vehicle occupants in the vehicle, the vehicle being a vehicle of multiple vehicles involved in a collision, and the packaged mobile device sensor data indicating movement and position information pertaining to the collision, wherein at least a portion of the packaged mobile device sensor data is received from a mobile device, of the one or more mobile devices, based on the mobile device detecting that the collision occurred and setting itself, in response, to a heightened sense mode in which at least one selected from the group consisting of sampling frequency and sampling precision is increased to obtain the portion of the packaged mobile device sensor data that is included in the packaged mobile device sensor data;

sharing the packaged sensor data to a decentralized ledger, the decentralized ledger storing the shared packaged sensor data as part of a collection of sensor data, the collection of sensor data comprising sensor data from across multiple mobile devices of different vehicle occupants in the multiple vehicles involved in the collision;

extracting from the decentralized ledger the collection of sensor data from across the multiple mobile devices and correlating different sensor data thereof obtained from different mobile devices of the multiple mobile devices to determine consensus properties of the collision as informed by the collection of sensor data, wherein the collection of sensor data comprises data describing at least one biometric state of a vehicle occupant, and wherein the method determines, based at least in part on the at least one biometric state, a stress level of the vehicle occupant, and at least one property of the collision based or the stress level of the vehicle occupant; and determining, based at least in part on the consensus properties of the collision, which of the different vehicle occupants were driving the multiple vehicles involved in the collision and behavior of the occupants driving the multiple vehicles at the time of, and following, the collision, wherein the determining which of the different vehicle occupants were driving the multiple vehicles involved in the collision comprises identifying, for a selected vehicle, of the multiple vehicles involved in the collision, in which a plurality of occupants were traveling at the time of the collision, a driver occupant of the plurality of occupants of the selected vehicle and at least one non-driver occupant of the plurality of occupants of the selected vehicle at the time of the collision.

2. The method of claim 1, wherein the packaged mobile device sensor data is received from the one or more mobile devices based on the one or more mobile devices detecting that the collision occurred.

3. The method of claim 1, wherein the consensus properties of the collision confirm that the collision occurred.

4. The method of claim 1, wherein the collection of sensor data comprises data from at least one selected from the group consisting of: one or more Global Positioning Satellite (GPS) sensors, one or more accelerometers, one or more gyroscopic sensors, one or more microphones, and one or more cameras of the multiple mobile devices.

5. The method of claim 1, wherein the decentralized ledger comprises a blockchain distributed among a private consortium of entities.

6. The method of claim 1, further comprising:
determining a location of the vehicle at the time of the collision, as indicated by the packaged mobile device sensor data;
identifying, based on the decentralized ledger, and based on the determined location of the vehicle at the time of the collision, the multiple vehicles involved in the collision as being (i) the vehicle and (ii) one or more other vehicles within a threshold distance of the vehicle at the time of the collision, and wherein the extracting extracts, as part of the collection of sensor data, sensor data from mobile devices of vehicle occupants in the one or more other vehicles.

7. The method of claim 6, further comprising using geohashes of the vehicle and the other vehicles to determine the location of the vehicle and one or more distances between the vehicle and the one or more other vehicles.

8. The method of claim 1, wherein the sensor data from across the multiple mobile devices of different vehicle occupants in the multiple vehicles involved in the collision is obtained and contributed to the decentralized ledger by multiple different servers, each being in communication with a different set of mobile devices of the multiple mobile devices.

9. The method of claim 1, wherein the one or more mobile devices comprises a plurality of mobile devices, and wherein each of the plurality of mobile devices securely stores, packages, and uploads, to one or more targets, a respective portion of the packaged mobile device sensor data.

10. A computer system comprising:
   a memory; and
   a processor in communication with the memory, wherein the computer system is configured to perform a method comprising:
      receiving packaged mobile device sensor data from one or more mobile devices of one or more vehicle occupants in a vehicle, the packaged mobile device sensor data comprising movement and position data from the one or more mobile devices and obtained by the one or more mobile devices as the one or more mobile devices travel with the one or more vehicle occupants in the vehicle, the vehicle being a vehicle of multiple vehicles involved in a collision, and the packaged mobile device sensor data indicating movement and position information pertaining to the collision, wherein at least a portion of the packaged mobile device sensor data is received from a mobile device, of the one or more mobile devices, based on the mobile device detecting that the collision occurred and setting itself, in response, to a heightened sense mode in which at least one selected from the group consisting of sampling frequency and sampling precision is increased to obtain the portion of the packaged mobile device sensor data that is included in the packaged mobile device sensor data;
      sharing the packaged sensor data to a decentralized ledger, the decentralized ledger storing the shared packaged sensor data as part of a collection of sensor data, the collection of sensor data comprising sensor data from across multiple mobile devices of different vehicle occupants in the multiple vehicles involved in the collision;
      extracting from the decentralized ledger the collection of sensor data from across the multiple mobile devices and correlating different sensor data thereof obtained from different mobile devices of the multiple mobile devices to determine consensus properties of the collision as informed by the collection of sensor data, wherein the collection of sensor data comprises data describing at least one biometric state of a vehicle occupant, and wherein the method determines, based at least in part on the at least one biometric state, a stress level of the vehicle occupant, and at least one property of the collision based on the stress level of the vehicle occupant; and
      determining, based at least in part on the consensus properties of the collision, which of the different vehicle occupants were driving the multiple vehicles involved in the collision and behavior of the occupants driving the multiple vehicles at the time of, and following, the collision, wherein the determining which of the different vehicle occupants were driving the multiple vehicles involved in the collision comprises identifying, for a selected vehicle, of the multiple vehicles involved in the collision, in which a plurality of occupants were traveling at the time of the collision, a driver occupant of the plurality of occupants of the selected vehicle and at least one non-driver occupant of the plurality of occupants of the selected vehicle at the time of the collision.

11. The computer system of claim 10, wherein the collection of sensor data comprises data from at least one selected from the group consisting of: one or more Global Positioning Satellite (GPS) sensors, one or more accelerometers, one or more gyroscopic sensors, one or more microphones, and one or more cameras of the multiple mobile devices.

12. The computer system of claim 10, wherein the decentralized ledger comprises a blockchain distributed among a private consortium of entities.

13. The computer system of claim 10, wherein the method further comprises:
   determining a location of the vehicle at the time of the collision, as indicated by the packaged mobile device sensor data;
   identifying, based on the decentralized ledger, and based on the determined location of the vehicle at the time of the collision, the multiple vehicles involved in the collision as being (i) the vehicle and (ii) one or more other vehicles within a threshold distance of the vehicle at the time of the collision, and wherein the extracting extracts, as part of the collection of sensor data, sensor data from mobile devices of vehicle occupants in the one or more other vehicles.

14. The computer system of claim 13, wherein the method further comprises using geohashes of the vehicle and the one or more other vehicles to determine the location of the vehicle and one or more distances between the vehicle and the one or more other vehicles.

15. The computer system of claim 10, wherein the sensor data from across the multiple mobile devices of different vehicle occupants in the multiple vehicles involved in the collision is obtained and contributed to the decentralized ledger by multiple different servers, each being in communication with a different set of mobile devices of the multiple mobile devices.

16. A computer program product comprising:
   a computer readable storage medium readable by a processing circuit and storing instructions for execution by the processing circuit for performing a method comprising:
      receiving packaged mobile device sensor data from one or more mobile devices of one or more vehicle occupants in a vehicle, the packaged mobile device sensor data comprising movement and position data from the one or more-mobile devices and obtained by the one or more mobile devices as the one or more mobile devices travel with the one or more vehicle occupants in the vehicle, the vehicle being a vehicle of multiple vehicles involved in a collision, and the packaged mobile device sensor data indicating movement and position information pertaining to the collision, wherein at least a portion of the packaged mobile device sensor data is received from a mobile device, of the one or more mobile devices, based on the mobile device detecting that the collision occurred and setting itself, in response, to a heightened sense mode in which at least one selected from the group consisting of: sampling frequency and sampling precision is increased to obtain the portion of the packaged mobile device sensor data that is included in the packaged mobile device sensor data;

sharing the packaged sensor data to a decentralized ledger, the decentralized ledger storing the shared packaged sensor data as part of a collection of sensor data, the collection of sensor data comprising sensor data from across multiple mobile devices of different vehicle occupants in the multiple vehicles involved in the collision;

extracting from the decentralized ledger the collection of sensor data from across the multiple mobile devices and correlating different sensor data thereof obtained from different mobile devices of the multiple mobile devices to determine consensus properties of the collision as informed by the collection of sensor data, wherein the collection of sensor data comprises data describing at least one biometric state of a vehicle occupant, and wherein the method determines, based at least in part on the at least one biometric state, a stress level of the vehicle occupant, and at least one property of the collision based on the stress level of the vehicle occupant; and determining, based at least in part on the consensus properties of the collision, which of the different vehicle occupants were driving the multiple vehicles involved in the collision and behavior of the occupants driving the multiple vehicles at the time of, and following, the collision, wherein the determining which of the different vehicle occupants were driving the multiple vehicles involved in the collision comprises identifying, for a selected vehicle, of the multiple vehicles involved in the collision, in which a plurality of occupants were traveling at the time of the collision, a driver occupant of the plurality of occupants of the selected vehicle and at least one non-driver occupant of the plurality of occupants of the selected vehicle at the time of the collision.

17. The computer program product of claim 16, wherein the decentralized ledger comprises a blockchain distributed among a private consortium of entities.

18. The computer program product of claim 16, wherein the method further comprises:
   determining a location of the vehicle at the time of the collision, as indicated by the packaged mobile device sensor data;
   identifying, based on the decentralized ledger, and based on the determined location of the vehicle at the time of the collision, the multiple vehicles involved in the collision as being (i) the vehicle and (ii) one or more other vehicles within a threshold distance of the vehicle at the time of the collision, and wherein the extracting extracts, as part of the collection of sensor data, sensor data from mobile devices of vehicle occupants in the one or more other vehicles.

19. The method of claim 1, wherein the collection of sensor data reflects, via movement data received from a particular mobile device, a gait of an occupant of the vehicle possessing the mobile device, and wherein the method uniquely identifies, based on the reflected gait, the occupant of the vehicle.

* * * * *